(12) United States Patent
Omata (10) Patent No.: US 9,804,808 B2
(45) Date of Patent: Oct. 31, 2017

(54) METHOD FOR CONTROLLING PRINTING APPARATUS, STORAGE MEDIUM, AND PRINTING APPARATUS FOR COMMUNICATING WITH A CHARGE SERVER TO PERFORM CHARGING CONTROL RELATED TO PRINTING

(71) Applicant: CANON KABUSHIKI KAISHA, Tokyo (JP)

(72) Inventor: Jun Omata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/958,711

(22) Filed: Dec. 3, 2015

(65) Prior Publication Data
US 2016/0162231 A1 Jun. 9, 2016

(30) Foreign Application Priority Data
Dec. 9, 2014 (JP) .................. 2014-249435

(51) Int. Cl.
*G06F 3/12* (2006.01)
*H04N 1/00* (2006.01)

(52) U.S. Cl.
CPC .......... *G06F 3/1236* (2013.01); *G06F 3/1203* (2013.01); *G06F 3/1292* (2013.01); *H04N 1/00106* (2013.01); *H04N 1/00244* (2013.01); *H04N 1/00925* (2013.01); *H04N 2201/0094* (2013.01)

(58) Field of Classification Search
CPC .... G06F 3/1236; G06F 3/1203; G06F 3/1292; H04N 1/00925; H04N 1/00244; H04N 1/00106; H04N 2201/0094
See application file for complete search history.

(56) References Cited

U.S. PATENT DOCUMENTS

2006/0139689 A1* 6/2006 Matsuda .............. G06Q 20/403
358/1.15
2008/0297822 A1* 12/2008 Miyahara ............... G03G 21/02
358/1.13
2013/0258399 A1* 10/2013 Nanaumi ............. G06K 15/405
358/1.15

FOREIGN PATENT DOCUMENTS

JP  2008299110 A  12/2008
JP  2013205982 A  10/2013

\* cited by examiner

*Primary Examiner* — Andrew H Lam
(74) *Attorney, Agent, or Firm* — Canon USA, Inc., IP Division (57) ABSTRACT

A printing apparatus determines whether a charging function is set to be enabled. If the charging function is set to be enabled, the printing apparatus prohibits use of a direct wireless communication mode.

19 Claims, 10 Drawing Sheets

METHOD FOR CONTROLLING PRINTING APPARATUS, STORAGE MEDIUM, AND PRINTING APPARATUS FOR COMMUNICATING WITH A CHARGE SERVER TO PERFORM CHARGING CONTROL RELATED TO PRINTING

BACKGROUND OF THE INVENTION

Field of the Invention

The present invention relates to a printing apparatus, a method for controlling the printing apparatus, and a storage medium.

Description of the Related Art

More and more printing apparatuses, such as multifunction peripherals and printers, are equipped with a wireless local area network (LAN) function. The printing apparatuses having the wireless LAN function receive a print job from an external apparatus, such as a personal computer (PC) and a mobile terminal, via an access point, and then perform print processing based on the received print job.

Some printing apparatuses directly perform wireless communication with an external apparatus without intervention of a relay apparatus such as an access point. Japanese Patent Application Laid-Open No. 2013-205982 discusses a printing apparatus that directly performs wireless communication with a mobile terminal by using Wi-Fi Direct or Bluetooth®.

A usage in which a printing apparatus charges for print processing has been known. Japanese Patent Application Laid-Open No. 2008-299110 discusses a configuration in which the number of sheets used in print processing and a setting about color printing/monochrome printing are notified to a charging server as charging information, and the charging server manages the charging information in a centralized manner.

Some printing apparatuses become unable to communicate with another apparatus on a network when directly performing wireless communication with an external apparatus without intervention of a relay apparatus such as an access point. If such a printing apparatus directly performs wireless communication with an external apparatus, the printing apparatus becomes unable to communicate with a charging server, whereby failing to perform appropriate charging control.

SUMMARY OF THE INVENTION

According to an aspect of the present invention, a printing apparatus for communicating with a charging server to perform charging control related to printing includes a communication unit configured to operate in a direct wireless communication mode in which an external apparatus and the printing apparatus directly perform wireless communication therebetween, a determination unit configured to determine whether a charging function for which the charging server is needed is set to be enabled, and a control unit configured to prohibit, if the charging function is set to be enabled, use of the direct wireless communication mode.

Further features of the present invention will become apparent from the following description of exemplary embodiments with reference to the attached drawings.

DESCRIPTION OF THE EMBODIMENTS

Exemplary embodiments of the present invention will be described in detail below with reference to the accompanying drawings. The following exemplary embodiments are not intended to limit the present invention set forth in the claims, and all combinations of the features described in the exemplary embodiments are not necessarily indispensable to the solving means of the present invention.

Figure 1:
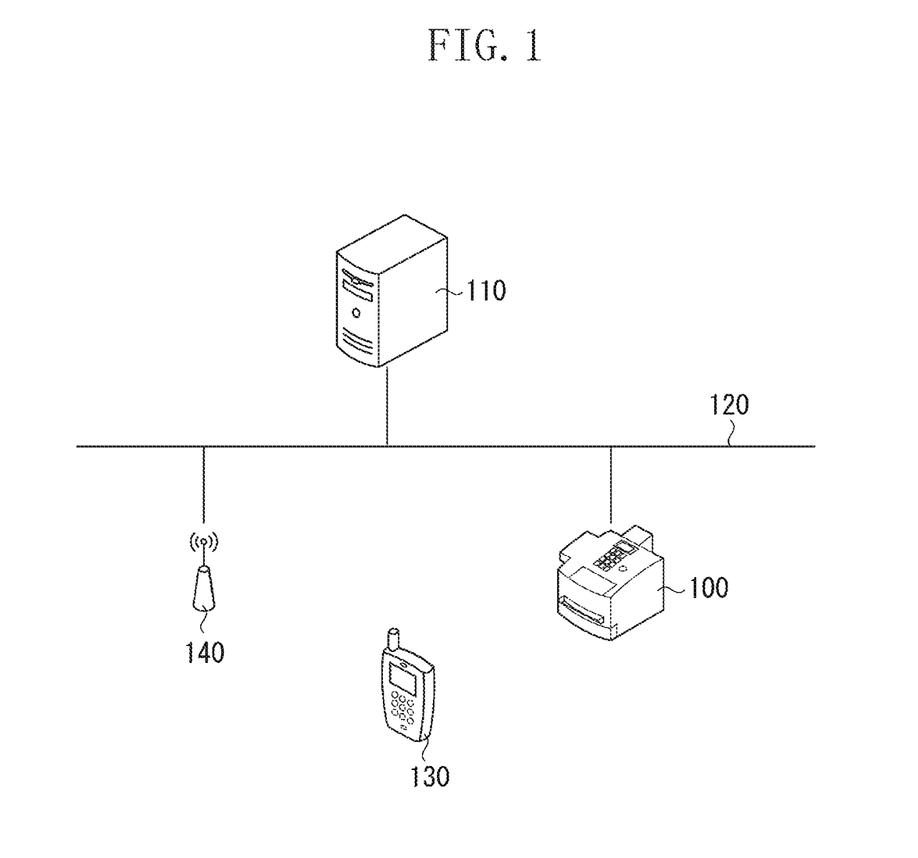
FIG. 1 is a diagram illustrating a configuration of a printing system.

A configuration of a printing system according to a first exemplary embodiment will be described with reference to FIG. 1. The printing system according to the present first exemplary embodiment includes a printing apparatus 100, a charging server 110, a network 120, a mobile terminal 130, and an access point 140.

The printing apparatus 100 and the charging server 110 can communicate with each other via the network 120. The printing apparatus 100 can receive a print job transmitted from an information processing apparatus (not illustrated) such as a personal computer (PC) on the network 120, and perform print processing based on the received print job. The charging server 110 stores charging information about the print processing performed by the printing apparatus 100. Specific examples of the charging information include the number of sheets used in the print processing and an amount of toner consumed in the print processing.

The mobile terminal 130 can communicate with an apparatus on the network 120, such as the printing apparatus 100, via the access point 140. The mobile terminal 130 can also perform wireless communication directly with the printing apparatus 100 without intervention of a relay apparatus such as the access point 140. The present exemplary embodiment will be described by using Wi-Fi Direct as an example of the wireless communication. Note that Wi-Fi Direct is used in the description solely by way of example. Other wireless communications (for example, access point mode and Bluetooth®) may be used as long as the mobile terminal 130 and the printing apparatus 100 directly perform wireless communication with each other. The mobile terminal 130 can transmit a print job to the printing apparatus 100 by wireless communication via the access point 140 or wireless communication based on Wi-Fi Direct. Receiving the print job transmitted from the mobile terminal 130, the printing apparatus 100 performs print processing based on the received print job.

Figure 2:
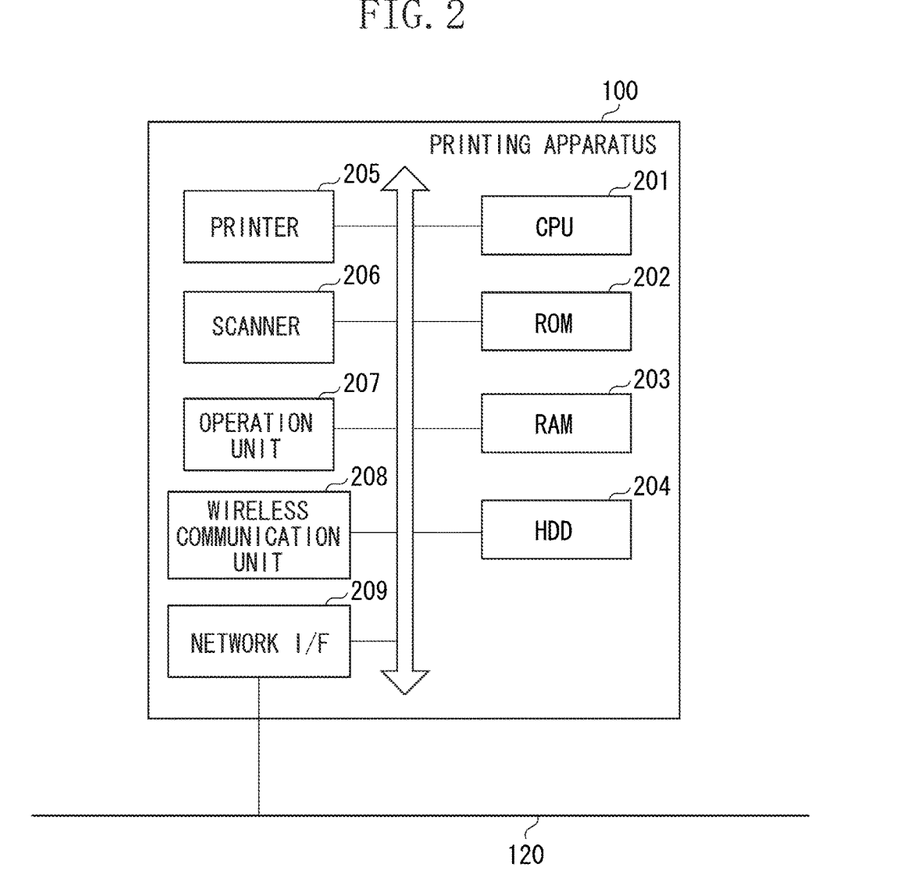
FIG. 2 is a diagram illustrating a configuration of a printing apparatus.

A configuration of the printing apparatus 100 will be described with reference to FIG. 2. While the printing apparatus 100 according to the present exemplary embodiment is assumed to be a multifunction peripheral, a printer without a scanner function may be used.

A central processing unit (CPU) 201 reads a control program stored in a read-only memory (ROM) 202, and performs various types of processing for controlling an operation of the printing apparatus 100. The ROM 202 stores the control program. A random access memory (RAM) 203 is used as a temporary storage area such as a main memory and a work area of the CPU 201. A hard disk drive (HDD) 204 stores various types of data such as a print job and a scanned image.

The printing apparatus 100 is configured so that one CPU 201 performs processing illustrated in the flowcharts to be described below. However, other configurations may be employed. For example, a plurality of CPUs may be configured to perform the processing illustrated in the flowcharts to be described below in a cooperative manner.

A printer 205 performs print processing on a sheet based on a print job received from an external apparatus or a scanned image generated by a scanner 206. The scanner 206 reads a document to generate a scanned image. The scanned image generated by the scanner 206 is printed by the printer 205 or stored in the HDD 204.

An operation unit 207 includes a liquid crystal display unit having a touch panel function, or a keyboard. The operation unit 207 displays various screens to be described below. A user can input instructions and information into the printing apparatus 100 via the operation unit 207.

A wireless communication unit 208 performs wireless communication with an external apparatus. The wireless communication unit 208 has two communication modes, that is, an infrastructure mode and a direct communication mode. The infrastructure mode is a communication mode to perform wireless communication with an external apparatus, such as the mobile terminal 130, via the access point 140. The direct communication mode is a communication mode to perform wireless communication with an external apparatus, such as the mobile terminal 130, without intervention of the access point 140. The wireless communication unit 208 performs wireless communication in either one of the infrastructure mode and the direct communication mode according to a device setting and/or a user instruction.

In a case where the wireless communication unit 208 operates in the direct communication mode, the wireless communication unit 208 directly performs wireless communication with an external apparatus, such as the mobile terminal 130, by using Wi-Fi Direct. Note that Wi-Fi Direct is used in the description solely by way of example. Other wireless communications (for example, an access point mode and Bluetooth®) may be used as long as the mobile terminal 130 and the printing apparatus 100 directly perform wireless communication with each other.

A network interface (I/F) 209 is connected to the network 209 via a wireless local area network (LAN) cable, and performs communication with an external apparatus.

The printing apparatus 100 performs either the communication by the network I/F 209 or the wireless communication by the wireless communication unit 208. As described above, there are two types of wireless communications by the wireless communion unit 208, namely, the infrastructure mode and the direct communication mode. The communication by the network I/F 209 will hereinafter be referred to as a wired communication mode. That is, the printing apparatus 100 selects and performs any of the wired communication mode, the infrastructure mode, and the direct communication mode according to a device setting and/or a user instruction.

Simultaneous operation of more than one of the wired communication mode, the infrastructure mode, and the direct communication mode can be a burden on the printing apparatus 100. The printing apparatus 100 thus selects and performs any one of the wired communication mode, the infrastructure mode, and the direct communication mode, and is not able to simultaneously operate in a plurality of communication modes.

An operation procedure when the user uses the direct communication mode, that is, Wi-Fi Direct, and operation screens displayed by the operation unit 207 will be described with reference to FIGS. 3A to 3D.

Figure 3A:
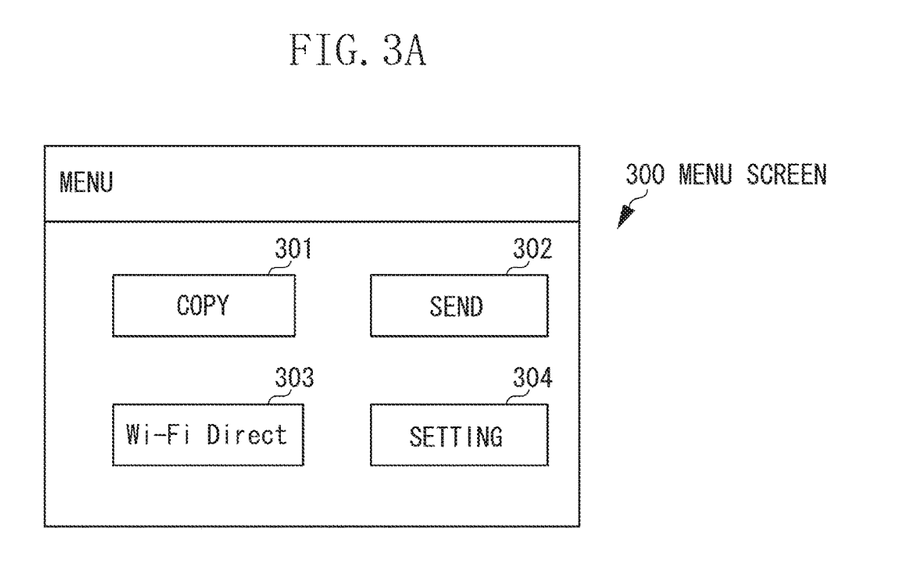
FIGS. 3A, 3B, 3C, and 3D are diagrams illustrating various screens displayed by an operation unit.

FIG. 3A illustrates a menu screen 300 which is a screen displayed by the operation unit 207. The menu screen 300 displays various functions that the user can use in a selectable manner. If the user selects (touches, in the case of a touch panel) a button 301, the operation unit 207 displays a not-illustrated copy screen for using a copy function. If the user selects a button 302, the operation unit 207 displays a not-illustrated send screen for using a send function. If the user selects a button 304, the operation unit 207 displays a not-illustrated setting screen for making various settings such as a sheet setting and a network setting.

If the user uses Wi-Fi Direct, the user selects a button 303 of the menu screen 300. If the user selects the button 303, the operation 207 displays a connection screen 310 illustrated in FIG. 3B. The connection screen 310 displays a start connection button 311 for starting Wi-Fi Direct connection processing. If the user selects the start connection button 311, an execution instruction for wireless communication based on Wi-Fi Direct is input to the printing apparatus 100.

Figure 3B:
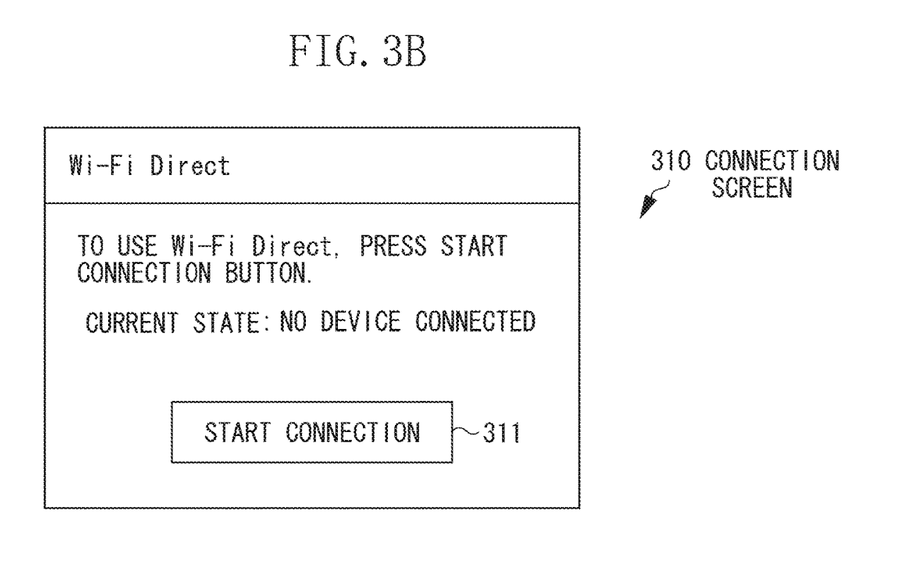
Figure 3C:
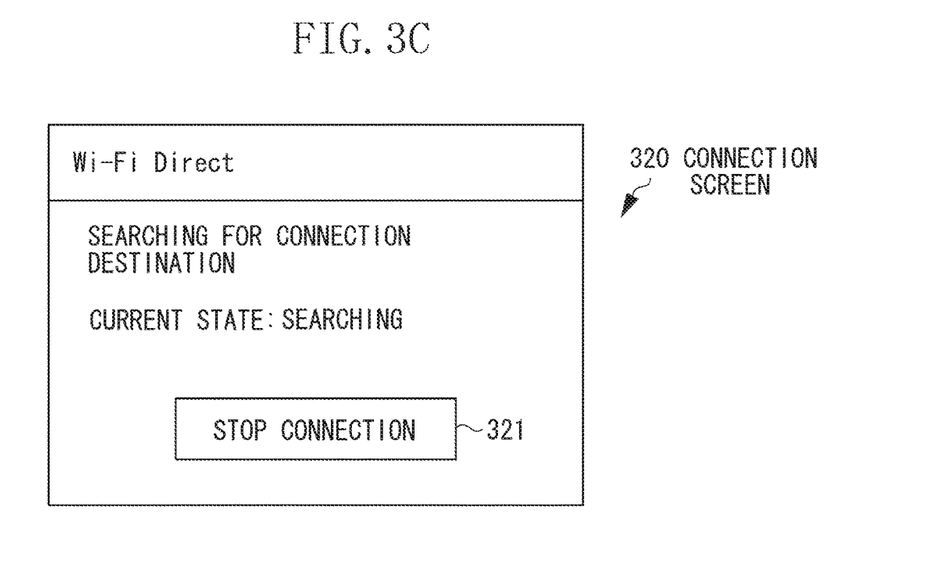
Figure 3D:
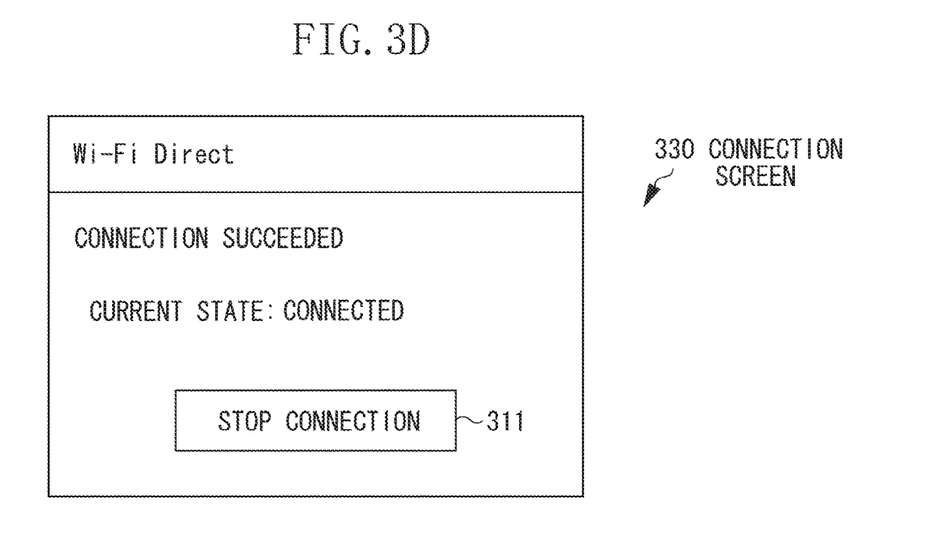

If the user selects the start connection button 311 on the connection screen 310, the operation unit 207 displays a connection screen 320 illustrated in FIG. 3C. The wireless communication unit 208 then starts the Wi-Fi Direct connection processing. Specifically, the wireless communication unit 208 searches for a connection destination. In the present exemplary embodiment, the mobile terminal 130 similarly starts Wi-Fi Direct connection processing, triggered by a user operation. The wireless communication unit 208 thereby identifies the mobile terminal 130 as a connection destination. To stop using Wi-Fi Direct, the user can select a button 321.

If the wireless communication unit 208 identifies the mobile terminal 130 as the connection destination, the wireless communication unit 208 and the mobile terminal 130 establish wireless communication based on Wi-Fi Direct therebetween. In the case of Wi-Fi Direct, either one of the printing apparatus 100 and the mobile terminal 130 operates as an access point to establish wireless communication between the printing apparatus 100 and the mobile terminal 130. In such a manner, the printing apparatus 100 and the mobile terminal 130 can directly perform wireless communication without intervention of a relay apparatus such as an access point, and the mobile terminal 130 can directly transmit a print job to the printing apparatus 100. If the wireless communication based on Wi-Fi Direct is established between the printing apparatus 100 and the mobile terminal 130, the operation unit 207 displays a connection screen 330 illustrated in FIG. 3D.

Charging control implemented by cooperation of the printing apparatus 100 and the charging server 110 will be described. The printing apparatus 100 has a charging function for charging for print processing. The charging function can charge fees, for example, according to the number of sheets used in print processing and the amount of toner consumed in print processing. If the printing apparatus 100 performs print processing, the printing apparatus 100 transmits the number of sheets used in the print processing and the amount of toner consumed in the print processing to the charging server 110 as charging information. The charging server 110 stores the charging information into an HDD of the charging server 110. The printing apparatus 100 may calculate the amount of fees according to the amount of sheets used in the print processing and the amount of toner consumed in the print processing, and transmit the calculated amount of fees to the charging server 110 as the charging information.

Figure 4:
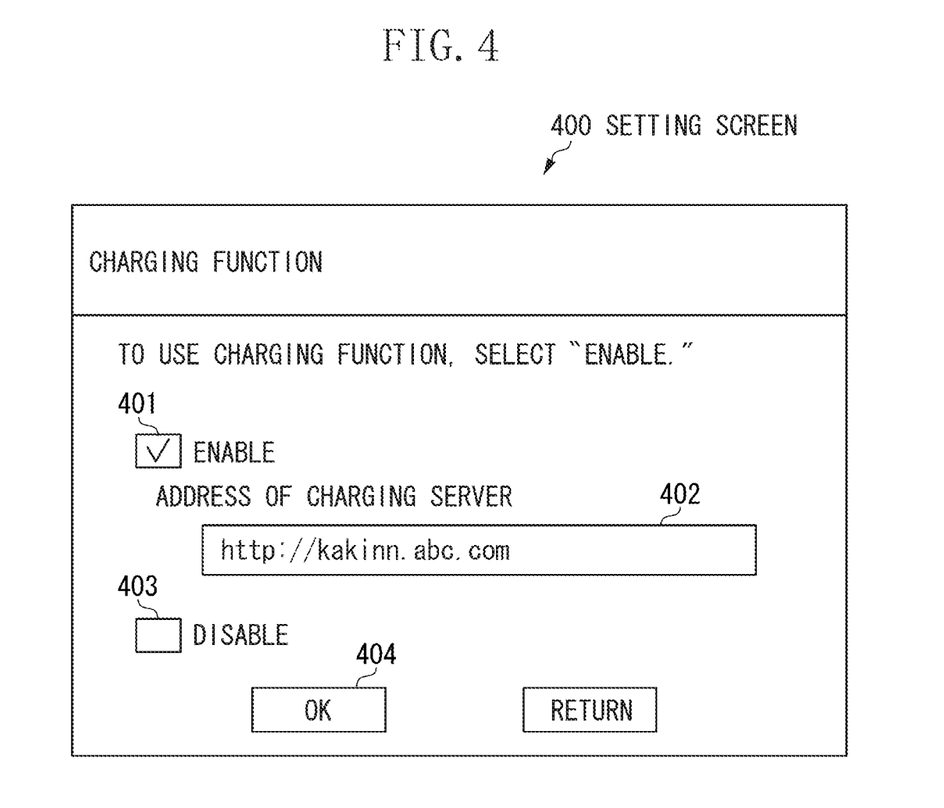
FIG. 4 is a diagram illustrating a setting screen for enabling a charging function.

FIG. 4 illustrates a setting screen 400 for setting whether to enable the charging function of the printing apparatus 100. The operation unit 207 of the printing apparatus 100 displays the setting screen 400. To enable the charging function, i.e., to use the charging function, the user (for example, a system administrator) can select an item 401. An Internet Protocol (IP) address of a charging server is input to an address field 402 as information for identifying a charging server. For example, the setting screen 400 illustrates a case where an IP address of the charging server 110 is input. To disable the charging function, i.e., to not use the charging function, the user can select an item 403. If the user selects either one of the items 401 and 403, and selects an OK button 404, a setting indicating whether to enable or disable the charging function is stored into the HDD 204 of the printing apparatus 100.

The method for making a setting to enable or disable the charging function is not limited to the setting using the setting screen 400 described in FIG. 4. In other methods, a license code for enabling the charging function may be input into the printing apparatus 100. A command for enabling the charging function may be transmitted from the charging server 110 to the printing apparatus 100.

If the printing apparatus 100 uses the charging function, the printing apparatus 100 needs to communicate with the charging server 110. If the printing apparatus 100 is running in the wired communication mode or the infrastructure mode, the printing apparatus 100 can communicate with the charging server 110 and can use the charging function. On the other hand, if the printing apparatus 100 is running in the direct communication mode, the printing apparatus 100 is not able to communicate with the charging server 110 and is not able to use the charging function.

Figure 5:
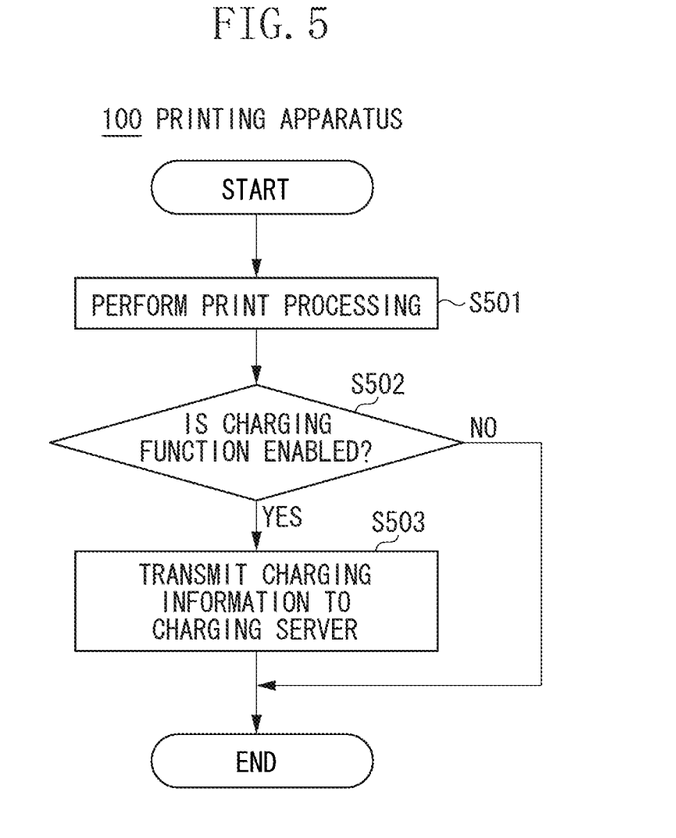
FIG. 5 is a flowchart illustrating processing performed by the printing apparatus.

Processing related to the charging control, which is to be performed by the printing apparatus 100 at the time of execution of print processing, will be described with reference to a flowchart of FIG. 5. Each step illustrated in the flowchart of FIG. 5 is processed by the CPU 201 loading a control program stored in a memory such as the ROM 202 into the RAM 203 and executing the control program. The processing illustrated in the flowchart of FIG. 5 is processing to be performed when the printing apparatus 100 is running in the wired communication mode or the infrastructure mode.

In step S501, the printer 205 performs print processing. The print processing is performed based on a print job received from the mobile terminal 130 or based on copy processing.

In step S502, after the execution of the print processing, the CPU 201 determines whether the charging function is enabled. The CPU 201 checks the result of the setting on the setting screen 400, stored in the HDD 204, to determine whether the charging function is enabled.

In step S502, if the charging function is determined to be enabled (YES in step S502), the processing proceeds to step S503. In step S503, the CPU 201 transmits charging information to the charging server 110. If the printing apparatus 100 is running in the wired communication mode, the network I/F 209 transmits the charging information to the charging server 110. If the printing apparatus 100 is running in the infrastructure mode, the wireless communication unit 208 transmits the charging information to the charging server 110 via the access point 140. The charging information is information indicating the number of sheets used in the printing apparatus and the amount of toner consumed in the print processing. The charging server 110 stores the received charging information into a memory such as an HDD of the charging server 110.

In step S502, if the charging function is determined to not be enabled (NO in step S502), the processing illustrated in the flowchart of FIG. 5 ends without transmitting the charging information to the charging server 110.

As described in the flowchart of FIG. 5, if the printing apparatus 100 is running in the wired communication mode or the infrastructure mode, the charging function can be appropriately used. If the printing apparatus 100 is running in the direct communication mode, however, the printing apparatus 100 is not able to communicate with the charging server 110 and the charging function is thus unable to be appropriately used. Then, in the present exemplary embodiment, if the charging function is set to be enabled, i.e., the charging control by the charging server 110 is needed, the printing apparatus 100 is prohibited from operating in the direct communication mode. Such processing will be described in detail with reference to FIG. 6.

Figure 6:
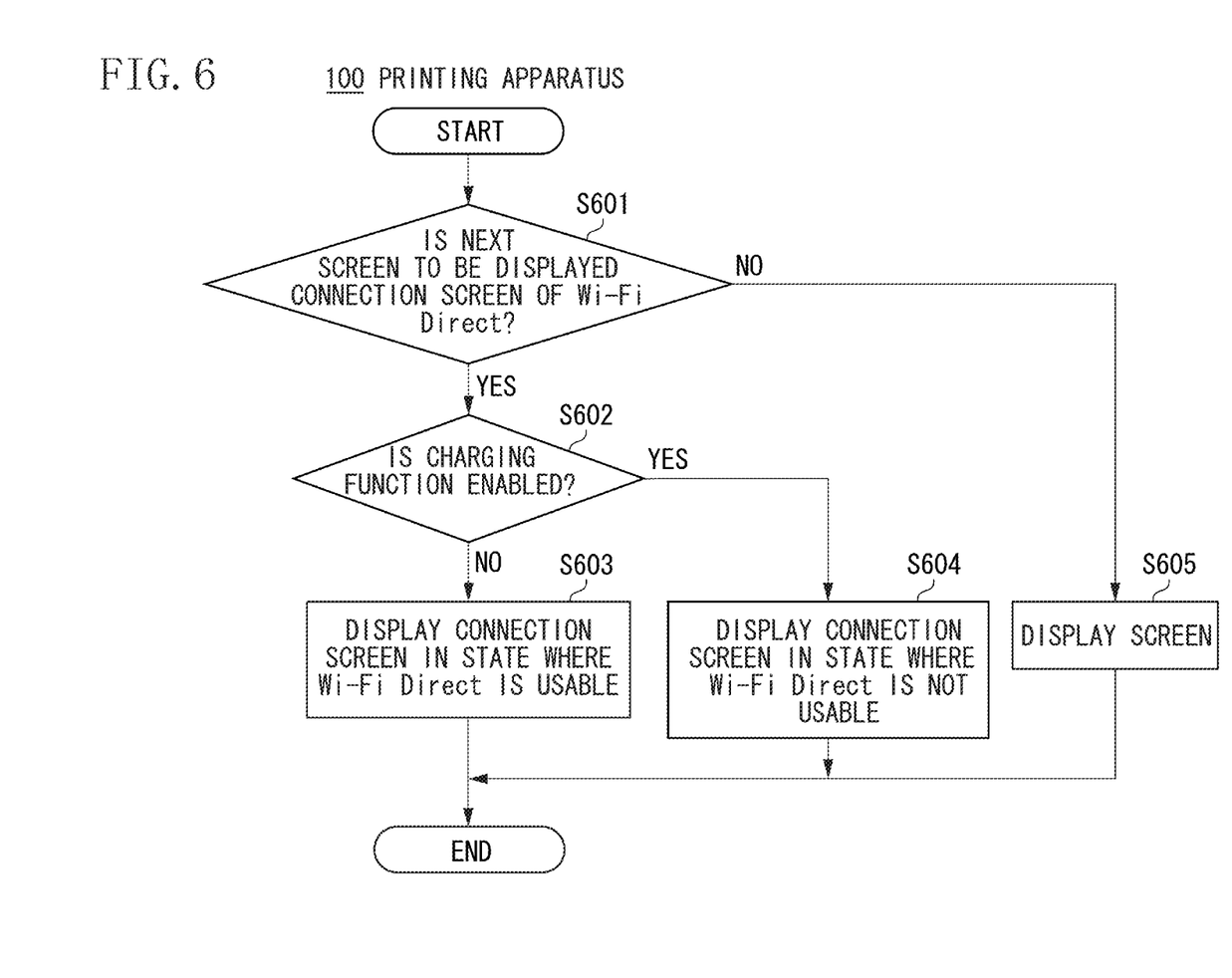
FIG. 6 is a flowchart illustrating processing performed by the printing apparatus.

The processing illustrated in a flowchart of FIG. 6 is processing to be performed if a screen transition occurs in the printing apparatus 100. Each step illustrated in the flowchart of FIG. 6 is processed by the CPU 201 loading a control program stored in a memory such as the ROM 202 into the RAM 203 and executing the control program.

If a screen transition occurs due to a user operation, then in step S601, the CPU 201 determines whether the next screen to be displayed is a connection screen related to the direct communication mode. Specifically, the CPU 201 determines whether the next screen to be displayed is the connection screen 310 of Wi-Fi Direct described in FIG. 3B. In step S601, if the CPU 201 determines that the next screen to be displayed is not the connection screen 310 of Wi-Fi Direct (NO in step S601), the processing proceeds to step S605. In step S605, the CPU 201 controls the operation unit 207 to display a screen according to the screen transition, and the operation display 207 displays the screen according to the screen transition. For example, if the next screen to be displayed is a copy screen (NO in step S601), then in step S605, the operation unit 207 displays the copy screen. On the other hand, in step S601, if the CPU 201 determines that the next screen to be displayed is the connection screen 310 of Wi-Fi Direct (YES in step S601), the processing proceeds to step S602.

In step S602, the CPU 201 determines whether the charging function is enabled. The CPU 201 checks the result of the setting on the setting screen 400, stored in the HDD 204, to determine whether the charging function is enabled.

In step S602, if the CPU 201 determines that the charging function is not enabled (NO in step S602), the processing proceeds to step S603. In step S603, the CPU 201 controls the operation unit 207 to display a connection screen of Wi-Fi Direct in a state where Wi-Fi Direct is usable. For example, like the connection screen 310 illustrated in FIG. 3B, the operation unit 207 displays the connection screen 310 such that the start connection button 311 for using Wi-Fi Direct is in a state of being selectable by the user. If the charging function is not enabled, the printing apparatus 100 does not need to communicate with the charging server 110.

The printing apparatus 100 is thus permitted to operate in the direct communication mode (in other words, to perform wireless communication based on Wi-Fi Direct).

Figure 7A:
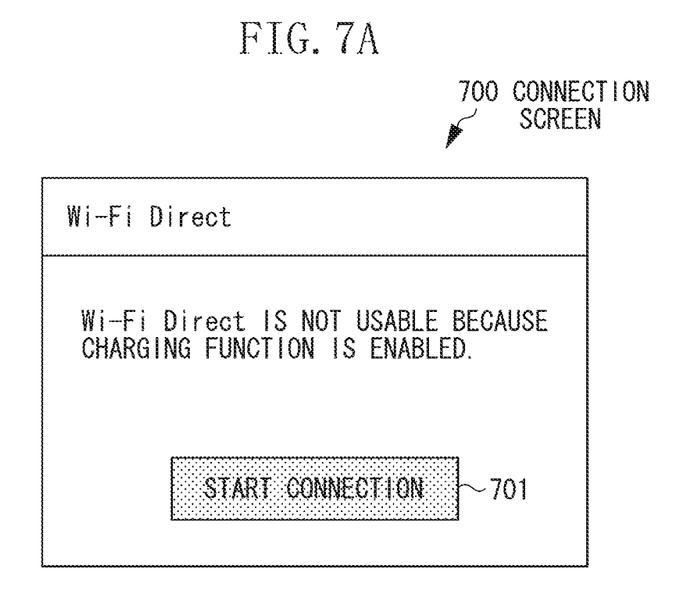
FIGS. 7A and 7B are diagrams illustrating various screens displayed by the operation unit.
Figure 7B:
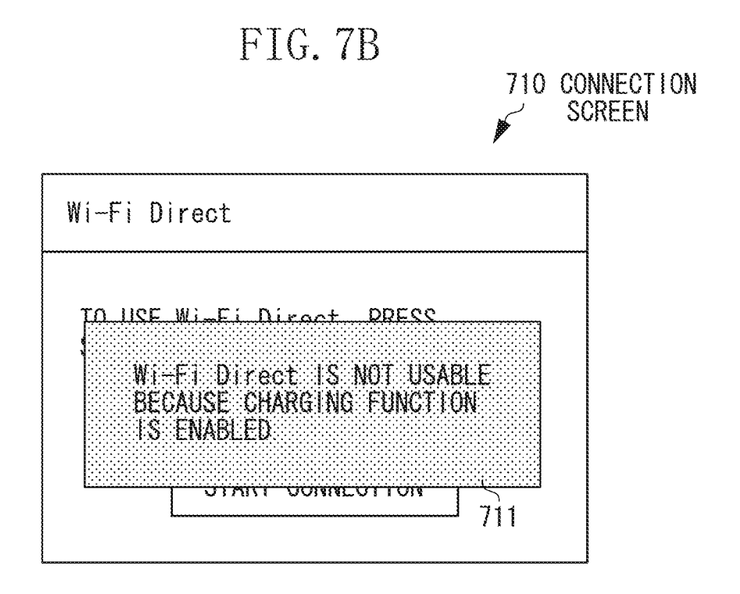

In step S602, if the CPU 201 determines that the charging function is enabled (YES in step S602), the processing proceeds to step S604. In step S604, the CPU 201 controls the operation unit 207 to display a connection screen of Wi-Fi Direct in a state where Wi-Fi Direct is not usable. For example, like a connection screen 700 illustrated in FIG. 7A, the operation unit 207 displays the display screen such that a start connection button 701 for using Wi-Fi Direct is in a disabled state of being not selectable by the user (for example, gray-out display). Alternatively, like a connection screen 710 illustrated in FIG. 7B, a warning message 711 that Wi-Fi Direct is not usable may be displayed when the user selects the start connection button. If the charging function is enabled, the printing apparatus 100 needs to communicate with the charging server 110. The printing apparatus 100 is thus prohibited from operating in the direct communication mode (in other words, performing wireless communication based on Wi-Fi Direct).

As described above, according to the present exemplary embodiment, whether to permit or prohibit the operation of the printing apparatus 100 in the direct communication mode is determined based on whether the charging function is enabled. If the charging function is enabled, the printing apparatus 100 needs to communicate with the charging server 110. In the present exemplary embodiment, if the charging function is enabled, the printing apparatus 100 is therefore prohibited from operating in the direct communication mode, i.e., performing wireless communication based on Wi-Fi Direct. As a result, if the charging function is enabled, the printing apparatus 100 operates in a communication mode in which the printing apparatus 100 can communicate with the charging server 110 (in the present exemplary embodiment, the wired communication mode or the infrastructure mode). This enables appropriate charging control.

The foregoing first exemplary embodiment has dealt with the configuration that prohibits the printing apparatus 100 from operating in the direct communication mode, i.e., performing wireless communication based on Wi-Fi Direct, if the charging function is enabled. In contrast, a second present exemplary embodiment deals with a configuration that permits the printing apparatus 100 to operate in the direct communication mode and performs appropriate charging control as well even if the charging function is enabled. A configuration of the entire printing system and a configuration of the printing apparatus 100 are similar to those of the first exemplary embodiment. A description thereof will thus be omitted.

Figure 8:
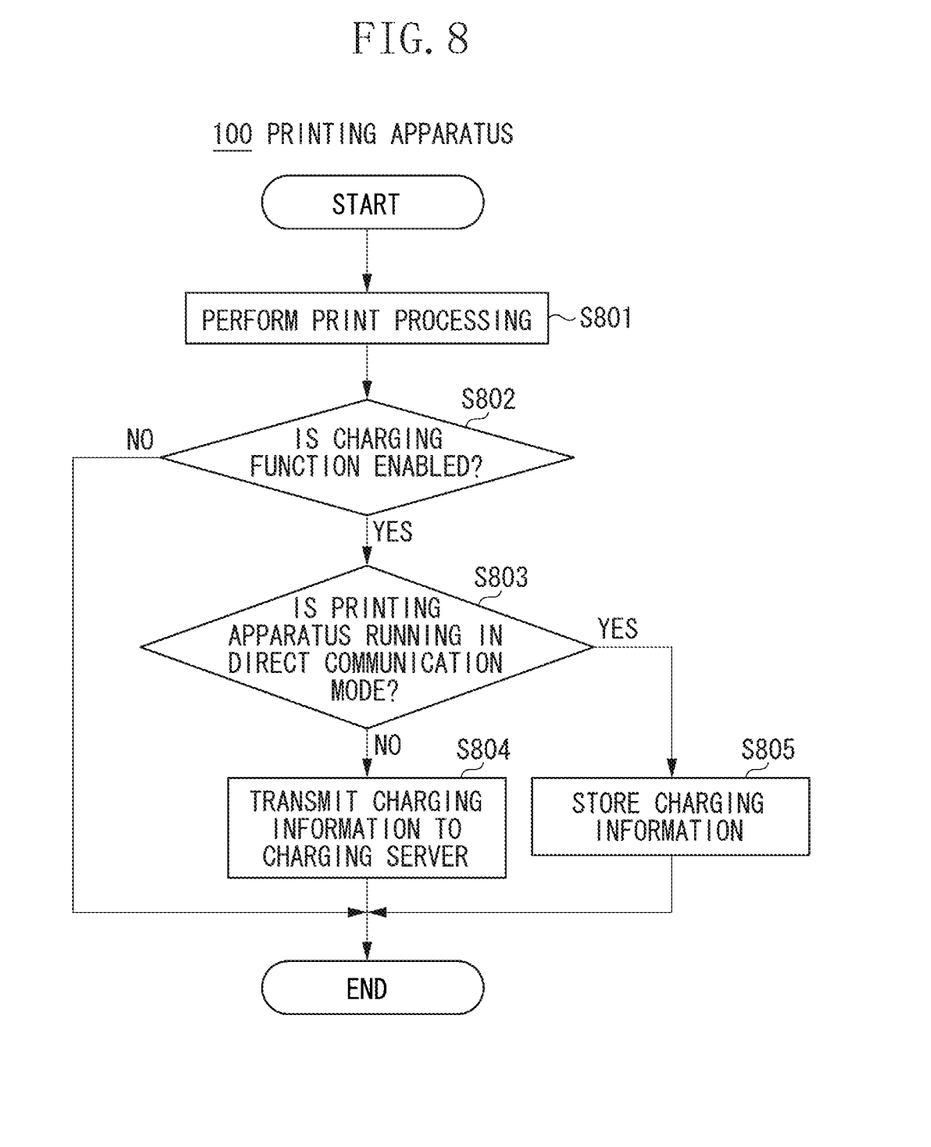
FIG. 8 is a flowchart illustrating processing performed by a printing apparatus.

Processing to be performed by the printing apparatus 100 at the time of execution of print processing will be described with reference to a flowchart of FIG. 8. Each step illustrated in the flowchart of FIG. 8 is processed by the CPU 201 loading a control program stored in a memory such as the ROM 202 into the RAM 203 and executing the control program.

In step S801, the printer 205 performs print processing. The print processing is performed based on a print job received from the mobile terminal 130 or based on copy processing.

In step S802, after the execution of the print processing, the CPU 201 determines whether the charging function is enabled. The CPU 201 checks the result of the setting on the setting screen 400, stored in the HDD 204, to determine whether the charging function is enabled. In step S802, if the charging function is determined to not be enabled (NO in step S802), the processing illustrated in the flowchart of FIG. 8 ends.

In step S802, if the charging function is determined to be enabled (YES in step S802), the processing proceeds to step S803. In step S803, the CPU 201 determines whether the printing apparatus 100 is running in the direct communication mode. In step S803, if the printing apparatus 100 is determined to not be running in the direct communication mode (NO in step S803), the processing proceeds to step S804. On the other hand, in step S803, if the printing apparatus 100 is determined to be running in the direct communication mode (YES in step S803), the processing proceeds to step S805.

Step S804 will be described. In step S804, the CPU 201 transmits charging information to the charging server 110. If the printing apparatus 100 is running in the wired communication mode, the network I/F 209 transmits the charging information to the charging server 110. If the printing apparatus 100 is running in the infrastructure mode, the wireless communication unit 208 transmits the charging information to the charging server 110 via the access point 140. The charging information is information indicating the number of sheets used in the print processing and the amount of toner consumed in the print processing. The charging server 110 stores the received charging information into a memory such as the HDD of the charging server 110. That is, if the printing apparatus 100 is running in the wired communication mode or the infrastructure mode, the charging information is transmitted to the charging server 100 in response to the completion of the print processing.

Step S805 will be descried. In step S805, the CPU 201 stores the charging information into the HDD 204. If the processing of step S805 is performed, the printing apparatus 100 is running in the direct communication mode and is therefore unable to communicate with the charging server 110. Then, in the present exemplary embodiment, if the printing apparatus 100 is running in the direct communication mode, the printing apparatus 100 holds the charging information. The printing apparatus 100 then transmits the charging information held in the printing apparatus 100 to the charging server 110 when shifting from the direct communication mode to the wired communication mode or the infrastructure mode.

Figure 9:
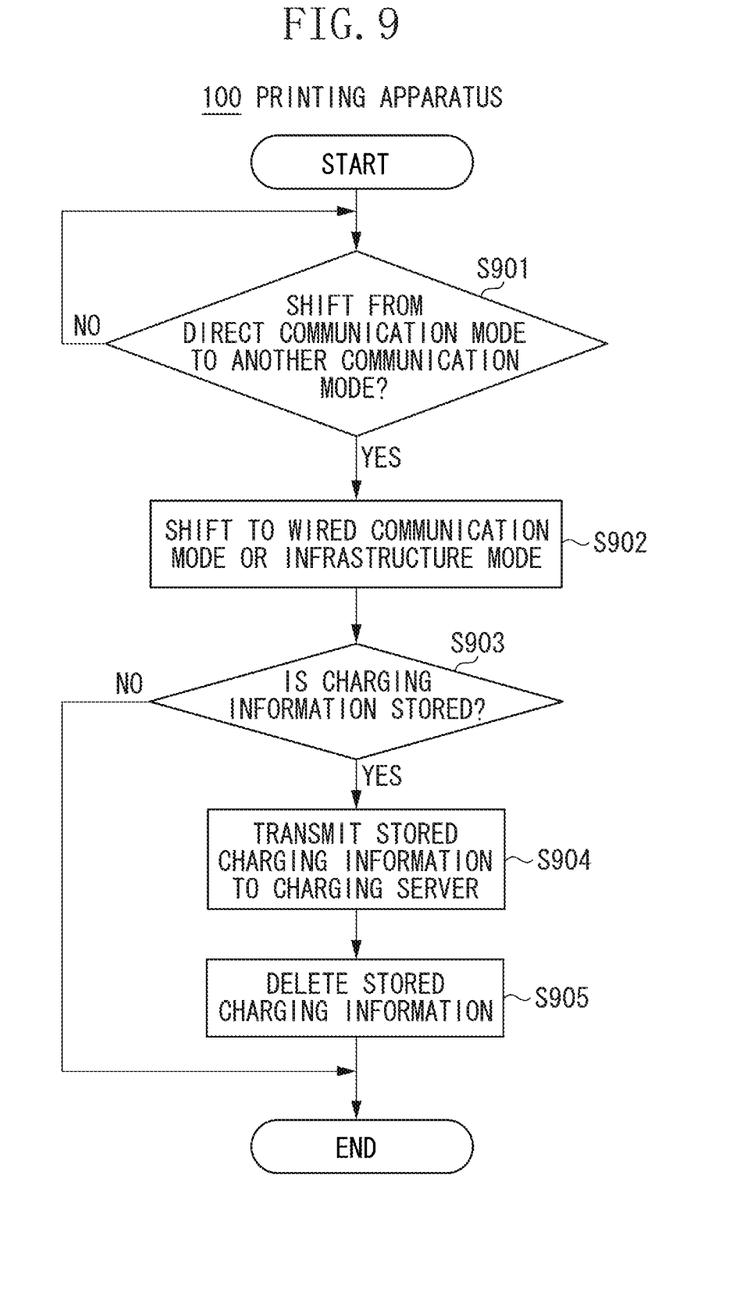
FIG. 9 is a flowchart illustrating processing performed by the printing apparatus.

Now, processing for transmitting the charging information stored in step S805 to the charging server 110 will be described with reference to a flowchart of FIG. 9. Each step illustrated in the flowchart of FIG. 9 is processed by the CPU 201 loading a control program stored in a memory such as the ROM 202 into the RAM 203 and executing the control program.

In step S901, the CPU 201 determines whether to shift from the direct communication mode to another communication mode. For example, if the printing apparatus 100 operating in the direct communication mode has not been operated for a predetermined time, or if the user makes an operation for shifting to another communication mode, the CPU 201 determines to shift from the direction communication mode to another communication mode.

In step S902, the CPU 201 performs control so that the printing apparatus 100 shifts to the wired communication mode or the infrastructure mode. For example, if the user gives an instruction about the communication mode to be shifted, the printing apparatus 100 shifts from the direction communication mode to the wired communication mode or the infrastructure mode according to the instruction. Alternatively, the printing apparatus 100 automatically shifts back to the communication mode, in which the printing apparatus 100 had been operating, immediately before shifting to the direct communication mode. For example, if the printing apparatus 100 has shifted from the infrastructure mode to the direct communication mode, the printing apparatus 100 automatically returns to the infrastructure mode.

If the printing apparatus 100 shifts from the direct communication mode to the wired communication mode or the infrastructure mode, the processing proceeds to step S903. In step S903, the CPU 201 determines whether charging information to be transmitted to the charging server 110 is stored. If no charging information to be transmitted to the charging server 110 is stored (NO in step S903), the processing illustrated in the flowchart of FIG. 9 ends. On the other hand, if charging information to be transmitted to the charging server 110 is stored, i.e., if charging information is stored in the HDD 204 in step S805 (YES in step S903), the processing proceeds to step S904.

In step S904, the CPU 201 transmits the charging information stored in the HDD 204 (the charging information stored in step S805) to the charging server 110. If the printing apparatus 100 has shifted from the direct communication mode to the wired communication mode, the network I/F 209 transmits the charging information to the charging server 110. If the printing apparatus 100 has shifted from the direct communication mode to the infrastructure mode, the wireless communication unit 208 transmits the charging information to the charging server 110 via the access point 140. The charging server 110 stores the received charging information into a memory such as an HDD of the charging server 110. In step S905, the CPU 201 deletes the charging information stored in the HDD 204.

As described above, according to the present exemplary embodiment, if the printing apparatus 100 operates in the direct communication mode and the charging function is enabled, the printing apparatus 100 stores the charging information into the HDD 204 at the time of execution of the print processing. The printing apparatus 100 then transmits the charging information stored in the HDD 204 to the charging server 110 when the printing apparatus 100 has shifted from the direct communication mode to the wired communication mode or the infrastructure mode. In such a manner, even if the printing apparatus 100 is running in the direct communication mode in which the printing apparatus 100 is not able to communicate with the charging server 110 at the time of execution of print processing, the charging information is transmitted to the charging server 110 afterward. This enables appropriate charging control.

According to an exemplary embodiment of the present invention, a mechanism in which even a printing apparatus that can directly perform wireless communication with an external apparatus is capable of appropriate charging control by a charging server can be provided.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-249435, filed Dec. 9, 2014, which is hereby incorporated by reference herein in its entirety.

What is claimed is:

1. A printing apparatus for communicating with a charging server to perform charging control related to printing, the printing apparatus comprising:
   a wireless communicator that includes an infrastructure mode and a direct wireless communication mode in which the printing apparatus and an external apparatus wirelessly communicate with each other without via a relay apparatus, wherein, in a case where the wireless communicator operates in the direct wireless communication mode, the printing apparatus is not communicable with the charging server;
   a memory that stores instructions; and
   a processor that executes the instruction to:
   determine whether a charging function for which the charging server is to be used; and
   prohibit the wireless communicator from operating in the direct wireless communication mode and allow the wireless communicator to operating in the infrastructure mode on condition that the charging function is determined to be used.

2. The printing apparatus according to claim 1, wherein the wireless communicator is permitted to operate in the direct wireless communication mode on condition that the charging function is determined not to be used.

3. The printing apparatus according to claim 1, further comprising a display that displays a connection screen including an instruction button with which a user instructs the printing apparatus to start operating in the direct wireless communication mode,
   wherein, in a case where the wireless communicator is prohibited from operating in the direct wireless communication mode, the instruction button is in a disabled state.

4. The printing apparatus according to claim 1, further comprising a display that displays a setting screen for a user to set whether to use the charging function,
   wherein, in a case where the charging function is set to be used in the setting screen, it is determined that the charging function is to be used.

5. The printing apparatus according to claim 1, wherein the direct wireless communication mode is a mode to perform wireless communication based on Wi-Fi Direct.

6. The printing apparatus according to claim 1, further comprising a display that displays a connection screen including an instruction button with which a user instructs the printing apparatus to start operating in the direct wireless communication mode, wherein, in a case where the wireless communicator is prohibited from operating in the direct wireless communication mode, the display displays a message indicating that the direct wireless communication mode is not usable in response to the instruction button having been operated by the user.

7. The printing apparatus according to claim 1, wherein the relay apparatus is an access point.

8. A method for controlling a printing apparatus for communicating with a charging server to perform charging control related to printing, the printing apparatus including a wireless communicator that includes an infrastructure mode and a direct wireless communication mode in which the printing apparatus and an external apparatus wirelessly communicate with each other without via a relay apparatus, wherein, in a case where the wireless communicator operates in the direct wireless communication mode, the printing apparatus is not communicable with the charging server, the method comprising:

determining whether a charging function for which the charging server is to be used; and prohibiting the wireless communicator from operating in the direct wireless communication mode and allowing the wireless communicator to operating in the infrastructure mode on condition that the charging function is determined to be used.

9. The method according to claim 8, wherein the wireless communicator is permitted to operate in the direct wireless communication mode on condition that the charging function is determined not to be used.

10. The method according to claim 8, further comprising displaying a connection screen including an instruction button with which a user instructs the printing apparatus to start operating in the direct wireless communication mode, wherein, in a case where the wireless communicator is prohibited from operating in the direct wireless communication mode, the instruction button is in a disabled state.

11. The method according to claim 8, further comprising displaying a setting screen for a user to set whether to use the charging function, wherein, in a case where the charging function is set to be used in the setting screen, it is determined that the charging function is to be used.

12. The method according to claim 8, wherein the direct wireless communication mode is a mode to perform wireless communication based on Wi-Fi Direct.

13. The method according to claim 8, further comprising displaying a connection screen including an instruction button with which a user instructs the printing apparatus to start operating in the direct wireless communication mode, wherein, in a case where the wireless communicator is prohibited from operating in the direct wireless communication mode, the display displays a message indicating that the direct wireless communication mode is not usable in response to the instruction button having been operated by the user.

14. A non-transitory computer-readable storage medium storing a program for causing a computer to execute a method for controlling a printing apparatus for communicating with a charging server to perform charging control related to printing, the printing apparatus including a wireless communicator that includes an infrastructure mode and a direct wireless communication mode in which the printing apparatus and an external apparatus wirelessly communicate with each other without via a relay apparatus, wherein, in a case where the wireless communicator operates in the direct wireless communication mode, the printing apparatus is not communicable with the charging server, the method comprising:

determining whether a charging function for which the charging server is to be used; and prohibiting the wireless communicator from operating in the direct wireless communication mode and allow the wireless communicator to operating in the infrastructure mode on condition that the charging function is determined to be used.

15. The non-transitory computer-readable storage medium according to claim 14 wherein the wireless communicator is permitted to operate in the direct wireless communication mode on condition that the charging function is determined not to be used.

16. The non-transitory computer-readable storage medium according to claim 14, further comprising displaying a connection screen including an instruction button with which a user instructs the printing apparatus to start operating in the direct wireless communication mode, wherein, in a case where the wireless communicator is prohibited from operating in the direct wireless communication mode, the instruction button is in a disabled state.

17. The non-transitory computer-readable storage medium according to claim 14, further comprising displaying a setting screen for a user to set whether to use the charging function, wherein, in a case where the charging function is set to be used in the setting screen, it is determined that the charging function is to be used.

18. The non-transitory computer-readable storage medium according to claim 14, wherein the direct wireless communication mode is a mode to perform wireless communication based on Wi-Fi Direct.

19. The non-transitory computer-readable storage medium according to claim 14, further comprising displaying a connection screen including an instruction button with which a user instructs the printing apparatus to start operating in the direct wireless communication mode, wherein, in a case where the wireless communicator is prohibited from operating in the direct wireless communication mode, the display displays a message indicating that the direct wireless communication mode is not usable in response to the instruction button having been operated by the user.

* * * * *